United States Patent
Bertz et al.

(10) Patent No.: US 9,681,088 B1
(45) Date of Patent: Jun. 13, 2017

(54) SYSTEM AND METHODS FOR MOVIE DIGITAL CONTAINER AUGMENTED WITH POST-PROCESSING METADATA

(71) Applicant: Sprint Communications Company L.P., Overland Park, KS (US)

(72) Inventors: Lyle T. Bertz, Lee's Summit, MO (US); Trevor D. Shipley, Olathe, KS (US); Craig A. Sparks, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/704,795

(22) Filed: May 5, 2015

(51) Int. Cl.
*H04N 9/80* (2006.01)
*H04N 5/93* (2006.01)
*H04N 5/85* (2006.01)
*G06F 17/30* (2006.01)
*G11B 27/034* (2006.01)
*G11B 27/28* (2006.01)

(52) U.S. Cl.
CPC ......... *H04N 5/85* (2013.01); *G06F 17/30781* (2013.01); *G06F 17/30864* (2013.01); *G11B 27/034* (2013.01); *G11B 27/28* (2013.01)

(58) Field of Classification Search
None
See application file for complete search history.

(56) References Cited

U.S. PATENT DOCUMENTS

2014/0119581 A1* 5/2014 Tsingos .................. H04S 3/008
381/300
2016/0080685 A1* 3/2016 De Saint Salvy . H04N 21/4302
386/285

OTHER PUBLICATIONS

Bertz, Lyle T, et al., "System and Method for Movie Digital Content Version Control Access During File Delivery and Playback", U.S. Appl. No. 14/704,797, filed May 5, 2015.

* cited by examiner

*Primary Examiner* — Heather Jones

(57) ABSTRACT

A processing server that builds metadata is disclosed. The server comprises a processor, a memory, and an application stored in the memory. The application when executed by the processor formats data into a data container, wherein the data comprises audio and video files of a movie. The application then builds metadata, wherein the metadata details what post-processing has been done on the data, wherein the metadata identifies what processing and algorithms are applied to the data and supports selection of data by a playback device. The application then writes metadata into the data container, wherein the playback device applies additional post-processing to the data in the data container based on the metadata.

20 Claims, 4 Drawing Sheets

SYSTEM AND METHODS FOR MOVIE DIGITAL CONTAINER AUGMENTED WITH POST-PROCESSING METADATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern movies are not generally sourced on film, but are files comprised of sequences of digital images and audio recordings. These digital images and audio recordings may have post-processing and filters applied to them. For example, the audio recordings may be formatted to play in a movie theater that may have 12 speakers. In another example, the digital images may be formatted to play in a 3 dimensional (3D) format. Movie theaters play these digital images and audio files as a movie at their theaters.

SUMMARY

In an embodiment, a processing server that builds metadata is disclosed. The processing server comprises a processor, a memory, and an application stored in the memory. The application when executed by the processor formats data into a data container, wherein the data comprises audio and video files of a movie. The application builds metadata, wherein the metadata details what post-processing has been done on the data, wherein the metadata identifies what processing and algorithms are applied to the data and supports selection of data by a playback device. The application then writes metadata into the data container, wherein the playback device applies additional post-processing to the data in the data container based on the metadata.

In an embodiment, a method of identifying metadata by a processing server is disclosed. The method comprises the processing server formatting data into a data container, wherein the data comprises audio and video files of a movie. The method further comprises building metadata by the processing server, wherein the metadata is associated with post-processing information that is done to the data and identifies algorithms that are applied to the data. The method further comprises the processing server writing metadata into the data container, wherein the metadata details what processing has been done on the data, wherein the metadata supports selection of data by a playback device, wherein a playback device reads the metadata in the container to identify what processing has been done to the data, wherein the playback device applies additional post-processing to the data based on the information in the metadata.

In an embodiment, a method of identifying metadata by a playback device is disclosed. The method comprises the playback device sending a request for a data container, wherein the data container is comprised of data and metadata, wherein the data comprises audio and video files of a movie wherein the metadata identifies processing that has been done to the data. The method further comprises the playback device receiving the data container. The method further comprises the playback device reading the metadata of the data container. The method further comprises the playback device one of applying or not applying post-processing and filters to the data based on the metadata of the data container, wherein the playback device automatically selects or blocks different filters based on previous post-processing.

The method further comprises the playback device playing the movie stored to the data container. These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
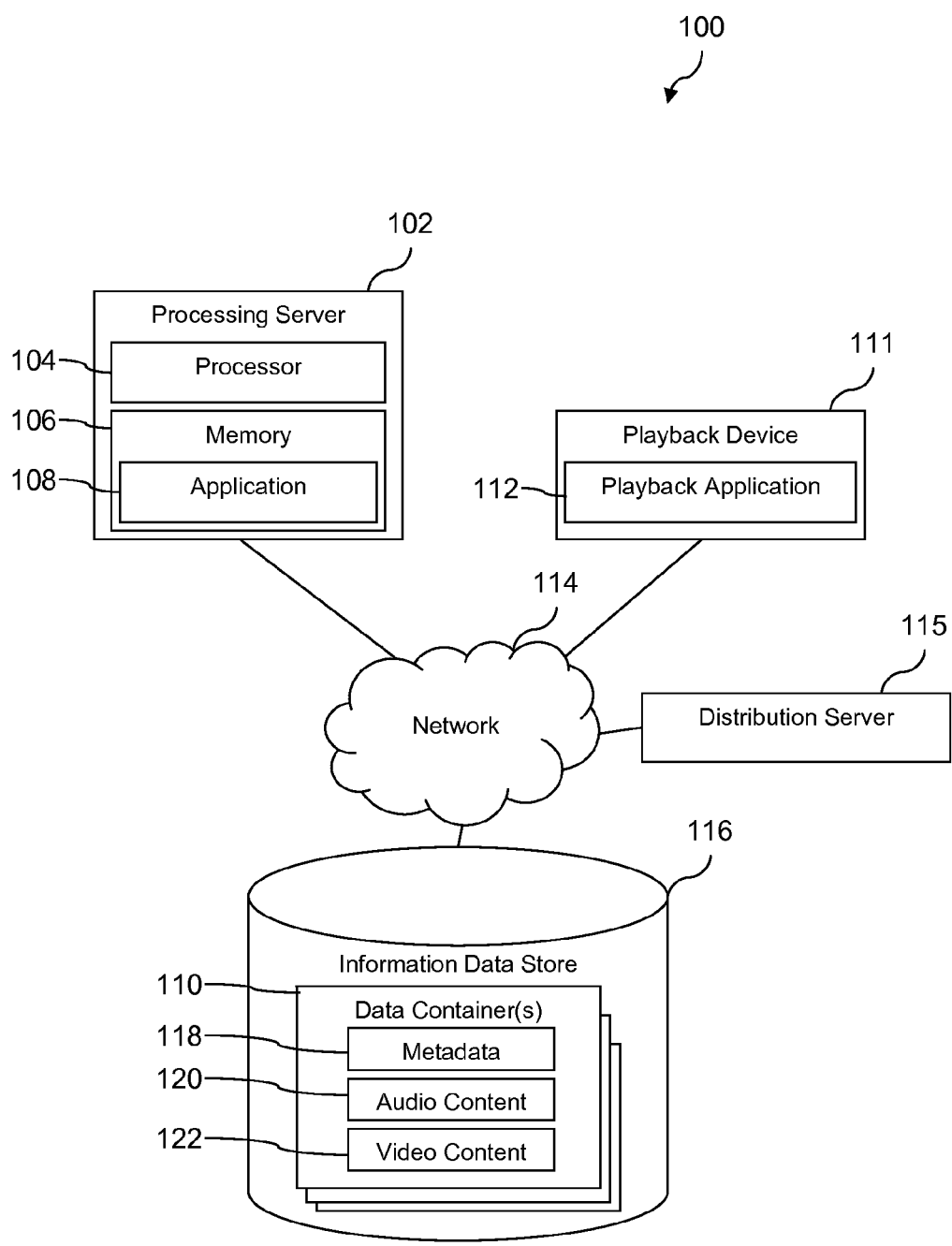
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for writing metadata associated with post-processing and filter information to a movie container by a processing server. Audio and video files of movies sometimes have post-processing and filters applied to them before they are sent out by media companies to movie theaters. Movie theaters that receive these files are unable to determine what post-processing or filters have already been applied to the files. In an embodiment, the post-processing and filters may optimize the audio files to play for a movie theater that utilizes audio processing for their theater or may apply three dimensional (3D) effects to the video files. Without knowing what post-processing and filtering may have been performed, movie theaters may apply additional post-processing and filters of their own. If the audio and video files have post-processing and filters already applied to them, and movie theaters apply their own post-processing and filters to the audio and video files, the movie theater may display less than optimal audio or video. In an embodiment, irreparable degradation may be done to the audio and video files that results in the files being unplayable in the movie theater as a result of overlap of post-processing and filters. If this happens, movie theaters may have to ask the media companies that they receive the movies from for a new copy of the files that were degraded.

The present disclosure teaches writing metadata into a data container that comprises the audio and video files of a movie. This metadata identifies what post-processing has been performed on the data in the data container. The metadata may identify processing information and identify algorithms that are applied to the data, e.g., audio processing applied to the audio files. Recipients of these data containers may be able to determine from the metadata if they should apply any more post-processing or filters to the audio and video files they play or if they should avoid doing so. In an embodiment, the metadata may also list which additional post processing may be useful or beneficial for the audio or video files in the data container. For example, the data in the data container may be optimized to play in a 12 speaker theater based on the audio file, and may also be optimized to play in a 3D format based on the video files. The audio files could be optimized by applying additional post-processing by a playback device at a movie theater. The metadata can identify this and movie theaters via the playback device may evaluate the metadata and apply additional post-processing based on the metadata. The metadata may also list which additional post-processing may be beneficial based on the type of playback device that receives the data container, the environment that the data will be used in, e.g., a 12 speaker surround sound movie theater, in addition to listing the post-processing that has already been done to the data in the data container.

In an embodiment, an application executing on a processing server formats data into a data container. The data container is comprised of audio and video files of a movie. The application also builds metadata that is associated with the data in the data container. The metadata details what post-processing has been done on the data. The metadata also identifies what processing and algorithms are applied to the data. The metadata also supports the selection of data by a playback device. The playback device may be any device one of a desktop computer, a laptop computer, or another computer. In an embodiment the playback device is located at a movie theater. The application writes metadata into the data container where it may be used for reference by the playback device to identify what post-processing has been done to the data in the data container and if further post-processing could be applied to the data in the data container by the playback device. The processing server or a distribution server transmits the data container to a playback device, e.g., a playback system in a movie theater. The playback device reads the metadata in the data container and with the metadata is able to identify what processing has been applied to the data before applying any post-processing or filters of its own. In an embodiment, the processing server may not transmit the data containers. The data containers may be stored to a separate information data store that may be comprised of the data containers. A distribution server may access the information data store and transmit the data containers containing the data and metadata to playback devices.

The processing server application allows movie theaters to receive a data container that is comprised of data and metadata. With the metadata that identifies what post-processing and filters have been applied to the audio and video files, movie theaters may be able to determine if any further post-processing or filters may be applied to the audio and video files. Because of the metadata, movie theaters may be able to avoid applying extra post-processing and filters that cause damage to the files or cause degraded quality and result in movie theaters asking for new copies of the files that were damaged. U.S. patent application Ser. No. 14/704,797 filed May 5, 2015, entitled "System and Methods for Movie Digital Content Version Control Access During File Delivery and Playback," by Lyle T. Bertz, et al., is incorporated by reference herein in its entirety.

Turning now to FIG. 1, a system 100 is described. The system 100 comprises a processing server 102, a playback device 111, a network 114, a distribution server 115, and an information data store 116. The processing server 102 also comprises a processor 104, a memory 106, and an application 108 stored to the memory 106. The playback device 111 also comprises a playback application 112. The information data store 116 comprises a plurality of data containers 110. The plurality of data containers further comprises metadata 118, audio content 120, and video content 122. The audio content 120 and video content 122 shall be referred to as audio files 120, and video files 122 henceforth.

In an embodiment, the processing server 102 formats data and writes metadata 118 that is stored to the plurality of data containers 110. The processing server 102 may transmit the data containers 110 to the information data store 116 for storage. The data that is formatted is associated with audio and video files 120/122 of a movie. The metadata 118 details what post-processing and/or filters have been applied to the data and identifies algorithms that are applied to the data. In an embodiment, post-processing and filters may be in reference to features that optimize the audio and video files 120/122 to be played as a movie in a movie theater by the playback device 111. For example, the audio files 120 may be processed so that they play in a surround sound format that matches the theater they are playing in. In an embodiment, the audio files 120 may be optimized to play through 5 speakers, 10 speakers, 15 speakers, or another number of speakers in a surround sound format. In another example, the video files 122 may be processed so that they play in a 3 dimensional (3D) visual format.

In an embodiment, the processing server 102 may write metadata 118 so that the playback device 111 is able to identify what post-processing and filters have been applied to the audio and video files 120/122; this may be important to the playback device 111 because if the playback device 111 is unable to determine what post-processing and/or filters have been applied to the audio and video files 120/122, the playback device 111 may apply post-processing and filters of its own to the data and cause degradation of quality to the audio and video files 120/122 because of post-processing and/or filter overlap. The application 108 may execute on the processor 104.

In an embodiment, the playback device 111 via the playback application 112 sends requests to and receives data containers 110 from the distribution server 115. In an embodiment, the playback device 111 may be a desktop computer, a laptop computer, or another computer. The playback device 111 may be located at a movie theater, or other places that play movies. The playback device 111 may also apply post-processing and/or filters to the audio and video files based on the set-up of the movie theater that the playback device 111 may be located in. For example, the movie theater that the playback device 111 may be located in may have 10 speakers spread out throughout a single theater room and the playback device 111 may format the audio files 120 in the data container 110 so that it plays audio through those speakers.

The distribution server 115 may receive data containers 110 from the processing server 102, receive requests for data containers 110, retrieve the data containers 110 from the information data store 116, and transmit the requested data containers 110 to the playback device 111. The information data store 116 may be comprised of data containers 110 and may allow the distribution server 115 to retrieve data containers 110 to transmit to the playback device 111. The network 114 may be a private communication network, a public communication, network or a combination thereof. While one processing server 102, one playback device 111, one distribution server 115, and one information data store 116 are illustrated in FIG. 1, it is understood that there may be any number of processing servers 102, playback devices 111, distribution servers 115, and information data stores 116.

In an embodiment, the application 108 is executed by the processor 104 of the processing server 102 and formats data into one of a plurality of data containers 110. The data that the processing server 102 is formatting are audio and video files 120/122 that are associated with a movie. The processing server 102 may begin the formatting process when it receives data that is marked and ready for formatting. The processing server 102 builds the metadata 118, wherein the metadata 118 is associated with post-processing and algorithms that are applied to the data. The processing server 102 via the application 108 writes metadata 118 into the data container 110. The metadata 118 is associated with post-processing information that is done to the data and identifies algorithms that are applied to the data. The metadata 118 also supports selection of data such as the audio content 120 and/or the video content 122 by the playback device 111. In an embodiment, the metadata 118 may be written by the processing server 102 as a header or footer of the data container 110, stored to a file located in the data container 110, or in another format by which the playback device 111 is able to locate and read the metadata in the data container 110. The processing server 102 may transmit the data containers 110 to the information data store 116 for storage where the distribution server 115 may retrieve and transmit the data containers 110 to the playback device 111.

In an embodiment, the playback device 111 may apply additional post-processing to the data in the data container 110 based on the metadata 118. The metadata 118 may also list which additional post-processing may be useful or beneficial for the audio content 120 or video content 122. For example, the data in the data container 110 may be optimized to play in a 12 speaker theater based on the audio content 120 listed by the metadata 118, and may also be optimized to play in a three-dimensional (3D) format based on the video content. The audio content 120 may be further optimized by applying additional post-processing by the playback device 111 at a movie theater. The metadata 118 may identify this and the playback device may be able evaluate the metadata 118 and apply additional post-processing to the audio content 120 based on the metadata 118. The metadata 118 may also list which additional post-processing may be beneficial based on the type of playback device 111 that receive the data container 110, the environment that the data in the data container 110 will be used in, e.g., a 12 speaker surround sound movie theater, in addition to listing the post-processing that has already been done to the data in the data container 110.

In an embodiment, the playback device 111 itself may request for the data container 110 as opposed to just receiving the data container 110 from the distribution server 115. The playback device 111 may read the metadata 118 in the data container 110, determine from the metadata 118 if the data has already been formatted for the movie theater that the movie is to be shown in, apply post-processing and filters to the data if it has not been formatted for movie theater, and then play the movie using the audio and video files 120/122.

Figure 2:
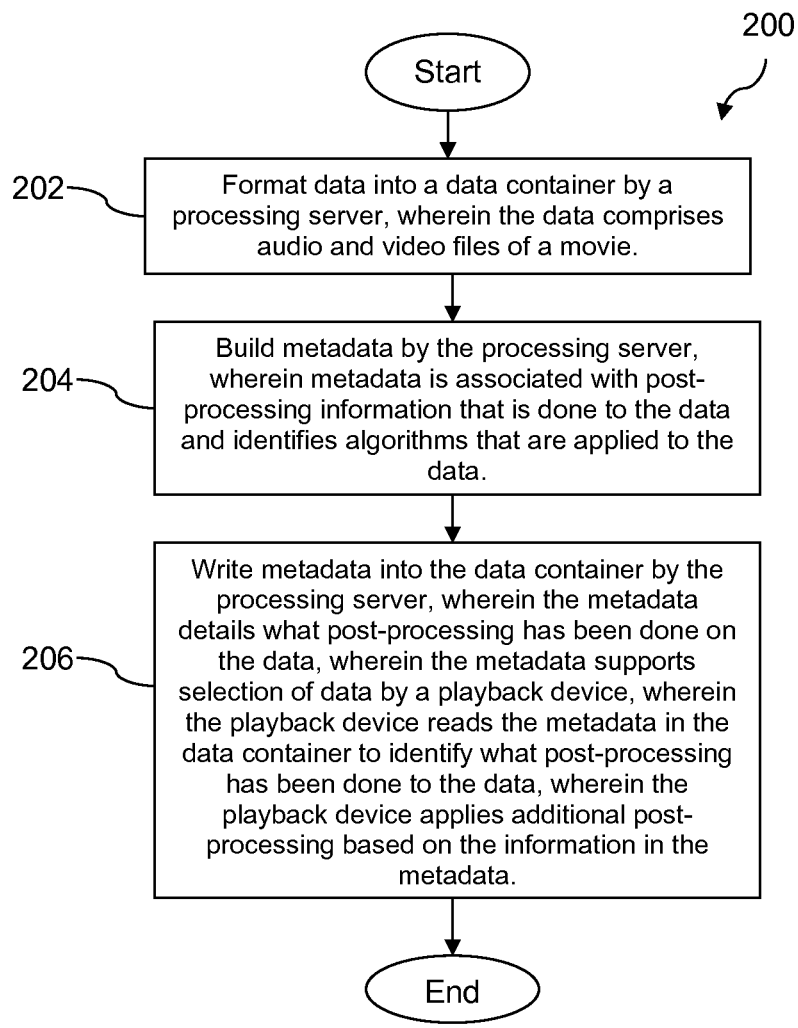
FIG. 2 is a flow chart of a method according to an embodiment of the disclosure.

In FIG. 2, a method 200 is described. At block 202 a processing server formats data into a data container, wherein the data is associated with audio and video files of a movie. At block 204, the processing server builds metadata, wherein the metadata is associated with post-processing information that is done to the data and identifies algorithms that are applied to the data. At block 206, writes metadata into the data container, wherein the metadata details what post-processing has been done on the data, wherein the metadata supports selection of data by a playback device, wherein the playback device reads the metadata in the data container to identify what post-processing has been done to the data, wherein the playback device applies additional post-processing to the data based on the information in the metadata.

Figure 3:
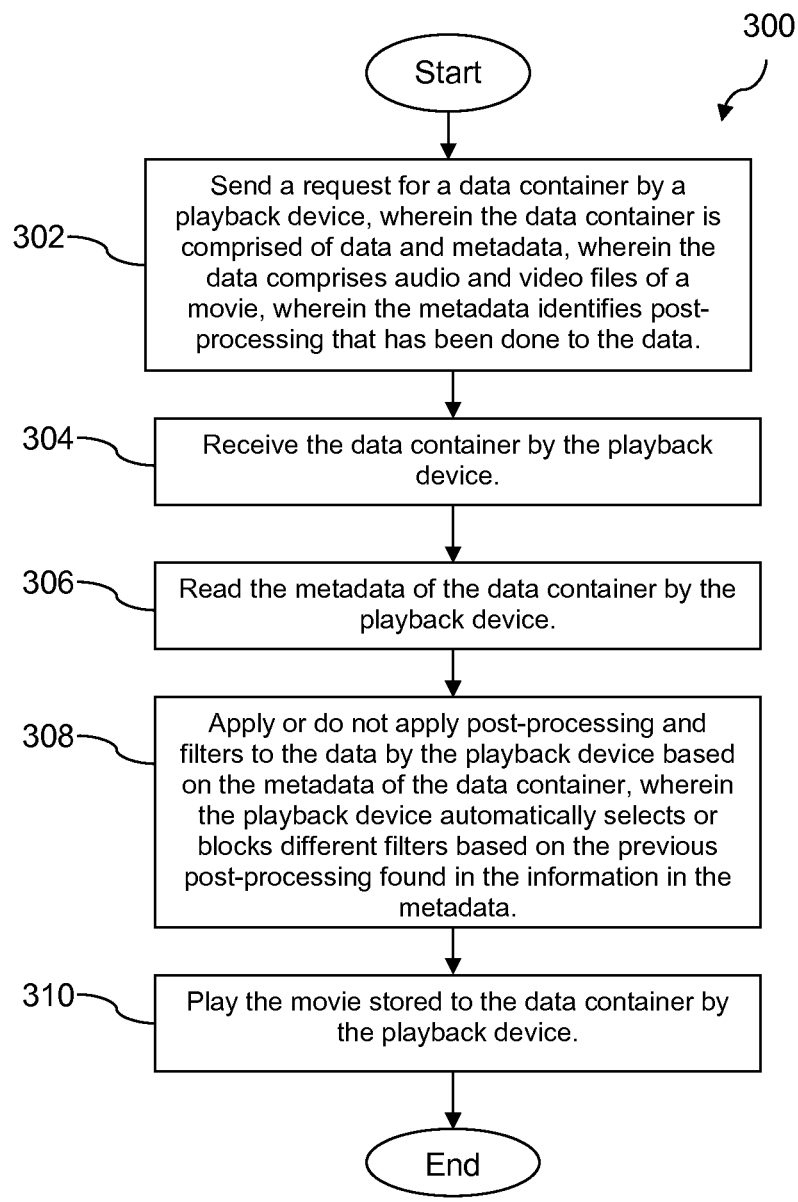
FIG. 3 is a flow chart of a method according to an embodiment of the disclosure.

In FIG. 3, a method 300 is described. At block 302, a playback device sends a request for a data container, wherein the data container is comprised of data and metadata, wherein the data is associated with audio and video files of a movie, wherein the metadata identifies post-processing that has been done to the data. At block 304, the playback device receives the data container. At block 306, the playback device reads the metadata of the data container. At block 308, the playback device does one of apply or does not apply post-processing and filters to the data based on the metadata of the data container, wherein the playback device automatically selects or blocks different filters based on the previous post-processing. At block 310, the playback device plays the movie stored to the data container.

Figure 4:
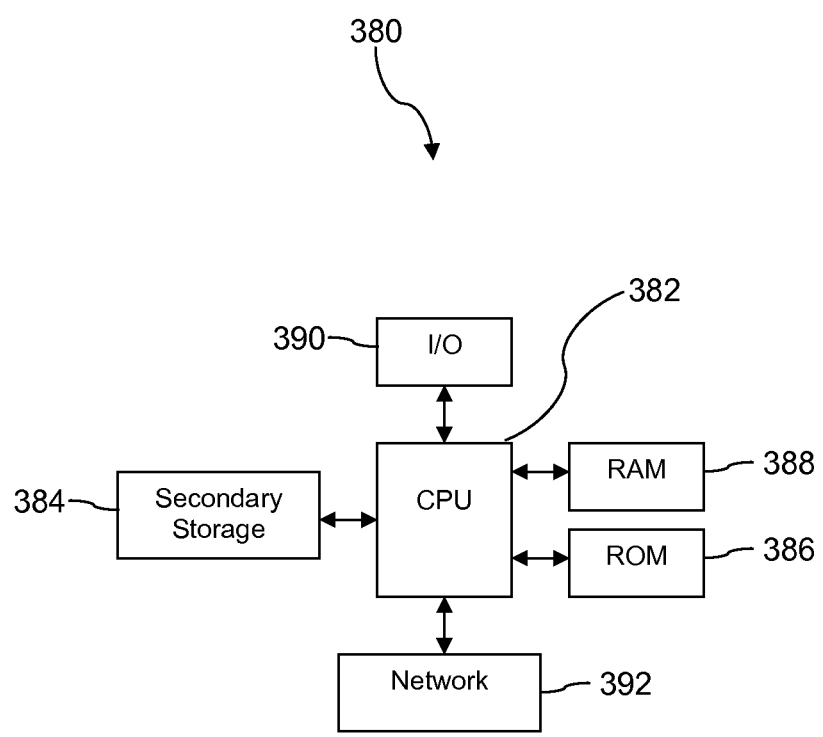
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processing server that builds metadata, comprising:
a processor,
a memory, and
an application stored in the memory that, when executed by the processor,
formats data previously modified by at least one post-processing filter or algorithm into a data container, wherein the data comprises audio and video files of a movie,
builds metadata, wherein the metadata identifies the post-processing filters or algorithms that have been previously applied to the data, and wherein the metadata supports selection of the data by a playback device,
writes the metadata into the data container to enable the playback device to identify non-redundant post-processing filters or algorithms to apply to the data in the data container based on the metadata, and
transmits the data container containing the data previously modified by post-processing filters or algorithms and the metadata identifying the post-processing filters or algorithms that have been previously applied to the data to the playback device.

2. The method of claim 1, wherein the metadata is written as a header or footer of the data container.

3. The method of claim 1, wherein the processing server and the playback device are communicatively coupled via a communication network.

4. The method of claim 3, wherein the communication network is a private communication network, a public communication network, or a combination thereof.

5. The method of claim 1, wherein the application transmits the data container to an information data store, and wherein a distribution server retrieves the data container from the information data store and transmits the data container to the playback device.

6. The method of claim 5, wherein the playback device is one of a desktop computer, a laptop computer, or another computer.

7. The method of claim 6, wherein the playback device is located at a movie theater or other place that plays movies.

8. A method of identifying metadata by a processing server, comprising:
formatting, by a processing server, data previously modified by at least one post-processing filter or algorithm into a data container, wherein the data comprises audio and video files of a movie;
building, by the processing server, metadata, wherein the metadata is associated with the post-processing filters or algorithms that have been previously applied to the data;
writing, by the processing server, the metadata into the data container, wherein the metadata supports selection of the data by a playback device, wherein the playback device reads the metadata in the data container to identify what post-processing filters or algorithms have been previously applied to the data and to identify non-redundant post-processing filters or algorithms to apply to the data in the data container based on the metadata, and wherein the playback device applies additional post-processing filters or algorithms to the data based on the metadata; and
transmitting, by the processing server to the playback device, the data container containing the data previously modified by post-processing filters or algorithms and the metadata associated with the post-processing filters or algorithms that have been previously applied to the data.

9. The method of claim 8, wherein the metadata is written as a header or footer of the data container.

10. The method of claim 8, wherein the playback device is one of a desktop computer, a laptop computer, or another computer.

11. The method of claim 8, wherein the playback device is located at a movie theater.

12. The method of claim 8, wherein the processing server and the playback device are communicatively coupled via a private communication network, a public communication network, or a combination thereof.

13. The method of claim 8, further comprising transmitting, by the processing server, the data container to an information data store for storage.

14. The method of claim 8, wherein the metadata identifies a recommendation of the additional post-processing filters or algorithms for application by the playback device to the data based on the post-processing filters or algorithms previously applied to the data prior to receipt of the data by the playback device.

15. The method of claim 8, wherein the post-processing filters or algorithms that are applied prior to receipt of the data by the playback device and that are identified by the metadata as having been previously applied to the data cause a modification of the data.

16. A method of identifying metadata by a playback device, comprising:
sending, by a playback device, a request for a data container, wherein the data container is comprised of data previously modified by at least one post-processing filter or algorithm and metadata, wherein the data comprises audio and video files of a movie, and wherein the metadata identifies the post-processing filters or algorithms that have been previously applied to the data;
receiving, by the playback device from the processing server, the data container containing the data previously modified by post-processing filters or algorithms and the metadata identifying the post-processing filters or algorithms that have been previously applied to the data;
reading, by the playback device, the metadata of the data container;
one of applying or not applying, by the playback device, new post-processing filters or algorithms to the data based on the metadata of the data container, wherein the playback device automatically selects or blocks the new post-processing filters or algorithms based on the metadata that identifies the post-processing filters or algorithms that have been previously applied to the data such that the playback devices identifies non-redundant post-processing filters or algorithms for use as the new post-processing filters or algorithms; and
playing, by the playback device, the movie stored to the data container.

17. The method of claim 16, wherein the playback device is one of a desktop computer or a laptop computer.

18. The method of claim 16, wherein the playback device is located at a movie theater.

19. The method of claim 16, wherein post-processing the audio files results in optimizing the audio files for playing in a movie theater via a surround sound format through 5, 10, or 15 speakers.

20. The method of claim 16, wherein post-processing the video files results in optimizing the video files for play in a 3 dimensional (3D) format.

* * * * *